(12) United States Patent
Iida et al.

(10) Patent No.: US 10,890,908 B2
(45) Date of Patent: Jan. 12, 2021

(54) VEHICLE CONTROL SYSTEM AND ACTION PLAN SYSTEM PROVIDED WITH SAME

(71) Applicant: HITACHI AUTOMOTIVE SYSTEMS, LTD., Ibaraki (JP)

(72) Inventors: Takahiro Iida, Tokyo (JP); Kohei Sakurai, Hitachinaka (JP); Taisetsu Tanimichi, Hitachinaka (JP); Satoshi Otsuka, Tokyo (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 331 days.

(21) Appl. No.: 15/328,922

(22) PCT Filed: Jul. 1, 2015

(86) PCT No.: PCT/JP2015/068932
§ 371 (c)(1),
(2) Date: Jan. 25, 2017

(87) PCT Pub. No.: WO2016/021340
PCT Pub. Date: Feb. 11, 2016

(65) Prior Publication Data
US 2017/0212513 A1    Jul. 27, 2017

(30) Foreign Application Priority Data

Aug. 7, 2014   (JP) .................. 2014-160940

(51) Int. Cl.
*G05D 1/00* (2006.01)
*B60Q 9/00* (2006.01)
(Continued)

(52) U.S. Cl.
CPC ............. *G05D 1/0061* (2013.01); *B60Q 9/00* (2013.01); *B60R 21/00* (2013.01); *B60W 30/09* (2013.01);
(Continued)

(58) Field of Classification Search
CPC .. B60Q 9/00; B60R 21/00; B60W 2050/0072; B60W 30/09; B60W 30/095;
(Continued)

(56) References Cited

U.S. PATENT DOCUMENTS

| 2010/0318240 A1 | 12/2010 | Kindo et al. |
| 2013/0184925 A1* | 7/2013 | Niemz .................. B60W 30/09 701/25 |
| 2015/0246678 A1* | 9/2015 | Hauler ..................... B62D 1/28 701/25 |

FOREIGN PATENT DOCUMENTS

| DE | 102009050399 A1 | 5/2011 |
| DE | 102010021591 A1 | 12/2011 |

(Continued)

OTHER PUBLICATIONS

Japanese Office Action dated Oct. 30, 2018 for the Japanese Patent Application No. 2014-160940.
(Continued)

*Primary Examiner* — Charles J Han
(74) *Attorney, Agent, or Firm* — Volpe Koenig

(57) ABSTRACT

In order to address the problem of providing a high-safety vehicle control system and action plan system, the present invention provides a vehicle control system comprising a trajectory generation determination unit (603) having an emergency trajectory generating unit (6032) for calculating an emergency trajectory while driving is being switched from a system to a driver at the time of a fault, and a motion control unit (604) having a trajectory retaining unit (6042) for retaining the emergency trajectory and a trajectory (Continued)

switching unit (6041) for switching whether to travel in the emergency trajectory retained by the trajectory retaining unit on the basis of a fault state detected by a malfunction detection unit.

5 Claims, 11 Drawing Sheets

(51) Int. Cl.
*G05D 1/02* (2020.01)
*B62D 6/00* (2006.01)
*B60W 30/10* (2006.01)
*B60W 50/02* (2012.01)
*B60R 21/00* (2006.01)
*G08G 1/16* (2006.01)
*B60W 30/09* (2012.01)
*B60W 30/095* (2012.01)
*B60W 50/00* (2006.01)

(52) U.S. Cl.
CPC .......... *B60W 30/095* (2013.01); *B60W 30/10* (2013.01); *B60W 50/02* (2013.01); *B62D 6/00* (2013.01); *G05D 1/0214* (2013.01); *G08G 1/16* (2013.01); *B60W 2050/0072* (2013.01); *G05D 1/0255* (2013.01); *G05D 1/0278* (2013.01)

(58) Field of Classification Search
CPC ......... B60W 30/10; B60W 50/02; B62D 6/00; G05D 1/0061; G05D 1/0214; G05D 1/0255; G05D 1/0278; G08G 1/16
See application file for complete search history.

(56) References Cited

FOREIGN PATENT DOCUMENTS

| | | |
|---|---|---|
| DE | 102012217002 A1 | 3/2014 |
| JP | 10-309960 A | 11/1998 |
| JP | 2004-130969 A | 4/2004 |
| JP | 2008-001286 A | 1/2008 |
| JP | 2009-040267 A | 2/2009 |
| JP | 2010-211301 A | 9/2010 |
| JP | 2010-287093 A | 12/2010 |
| JP | 2012-214123 A | 11/2012 |
| JP | 2013-147194 A | 8/2013 |

OTHER PUBLICATIONS

Chinese Office Action dated Mar. 4, 2019 for the Chinese Patent Application No. 201580033545.5 with Machine translation.
Japanese Office Action dated Nov. 7, 2017 for the Japanese Patent Application No. 2014-160940.
Japanese Office Action dated May 29, 2018 for the Japanese Patent Application No. 2014-160940.
Chinese Office Action dated Sep. 13, 2018 for the Chinese Patent Application No. 201580033545.5.
Chinese Office Action dated Apr. 27, 2018 for the Chinese Patent Application No. 201580033545.5.
Extended European Search Report, dated Mar. 8, 2018 for the European Application No. 15829498.3.
International Search Report for WO 2016/021340 A1 with Translation of Written Opinion of the International Search Authority.

\* cited by examiner (a)

VEHICLE CONTROL SYSTEM H/W CONFIGURATION

ECU H/W CONFIGURATION

ECU SOFTWARE MODULE CONFIGURATION (a)

(b)

| OBJECT ID | RECOGNITION DEVICE ID | POSITIONAL INFORMATION | TYPE | SPEED INFORMATION | RANGE | ... |
|---|---|---|---|---|---|---|
| Data_A | Sensor_A | xa, ya | CAR | 0, 100 | dxa, dya | |
| Data_B | Sensor_A | xb, yb | WALL | — | dxb, dyb | |
| Data_C | Sensor_B | xc, yc | CAR | 5, 100 | dxc, dyc | |
| ... | | ... | ... | ... | ... | |
| ... | | ... | ... | ... | ... | |
| ... | | ... | ... | ... | ... | |
| Data_Z | Sensor_A | xz, yz | WHITE LINE | — | dxz, dyz | |

OUTSIDE RECOGNITION MAP 1001 (LIST FORM)

(a)

(b)

| INSTRUCTION NO. | ACCELERATION | YAW RATE |
|---|---|---|
| 1 | 1m/h^2 | 4 deg/sec |

(c)

| INSTRUCTION NO. | ACCELERATION | YAW RATE |
|---|---|---|
| 1 | 1m/h^2 | 4 deg/sec |
| 2 | 1m/h^2 | 2 deg/sec |
| ... | ... | ... |
| | | |

TRAJECTORY INFORMATION IN
TRAJECTORY RETAINING UNIT

| INFORMATION FOR TRANSITION | INSTRUCTION VALUE A | INSTRUCTION VALUE B | ... |
|---|---|---|---|
| 10:10.10 | xxx | yyy | ... |
| 10:10.20 | xxx | yyy | ... |
| 10:10.30 | xxx | yyy | ... |
| 10:10.40 | xxx | yyy | ... |
| ... | ... | ... | ... |

LATEST TRAJECTORY INFORMATION

| INFORMATION FOR TRANSITION | INSTRUCTION VALUE A | INSTRUCTION VALUE B | ... |
|---|---|---|---|
| 10:10.23 | xxx | yyy | ... |

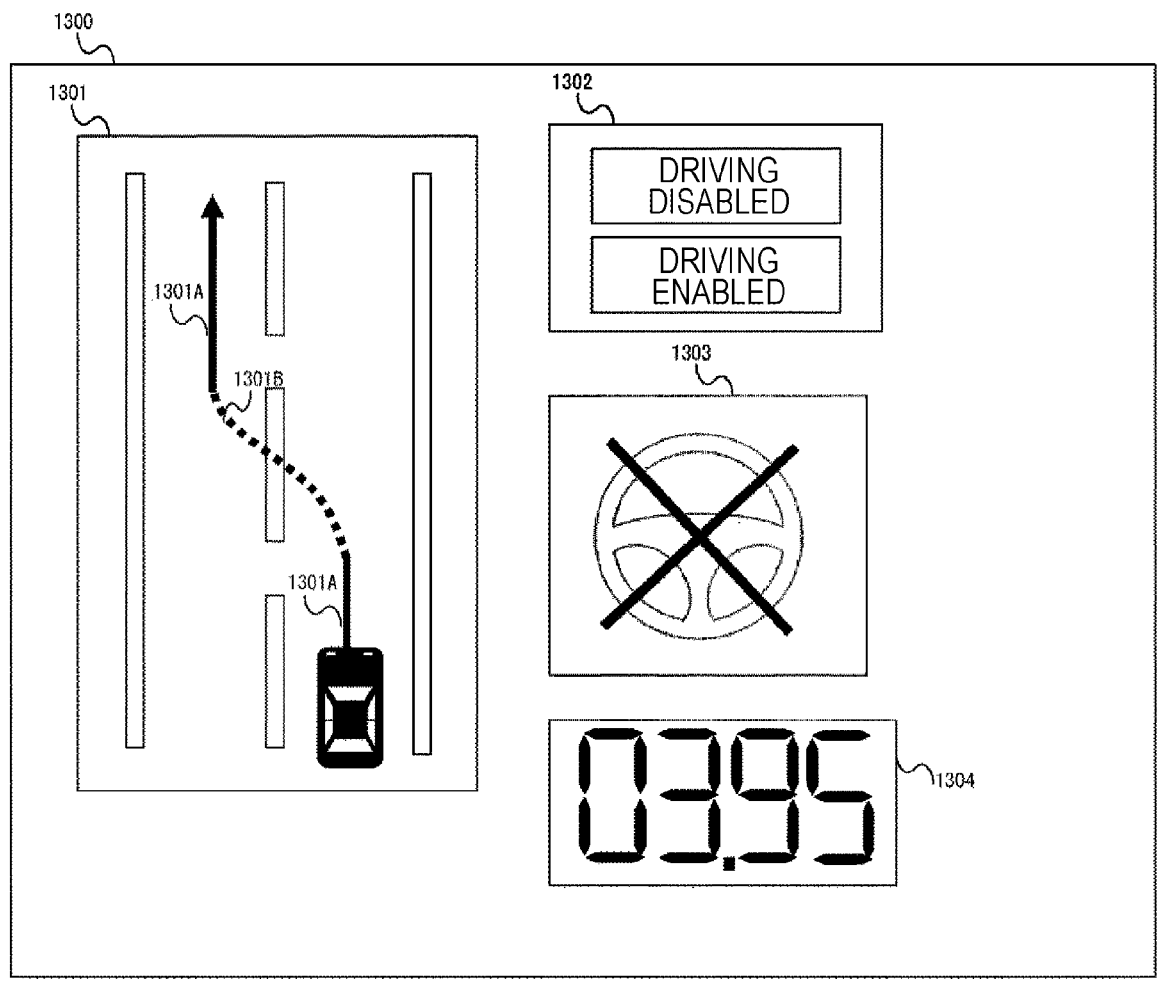

ial idea described in the claims, for example.

VEHICLE CONTROL SYSTEM AND ACTION PLAN SYSTEM PROVIDED WITH SAME

TECHNICAL FIELD

The present invention relates to a vehicle control system and an action plan system for automobiles.

BACKGROUND ART

JP 2010-287093 A (PTL 1) describes a background technique of this technical field. This publication discusses an issue of "providing a path evaluation apparatus and a path evaluation method which make it possible to improve driving efficiency, avoid an interference with another object, and evaluate a path of a moving object while retaining compatibility between driving efficiency and avoidance of the interference," and describes as a solution "A path generating unit 11 generates a plurality of predicted paths of an own vehicle based on driving information. An awfullized path generating unit 12 generates a plurality of awfullized paths associated with the plurality of the predicted paths. A pedestrian's approaching behavior determination unit 13 determines a pedestrian's approaching path, based on driving information sent from a driving information acquisition unit 2. An awfullized path evaluation unit 14 generates an awfullization evaluation value of each awfullized path, by comparing the plurality of the awfullized paths with the pedestrian's approaching path. A path evaluation unit 15 determines the predicted path with the highest awfullization evaluation value as a path of the own vehicle."

In addition, JP 2010-211301 A (PTL 2) describes another background technique. This publication discusses an issue of "providing a device and system for prediction/notification of accident, and an on-vehicle device to cope with, for example, an accident of catching a pedestrian when turning left at an intersection and to predict an area where an accident may occur considering the past traffic path histories of pedestrians and vehicles" and describes as a solution "When a vehicle entering the intersection reaches a predetermined point A1, the prediction area of accident occurrence is predicted on the basis of pedestrian information near the intersection when the entering vehicle's approaching the predetermined point A1, signal light information of a traffic light 5, and a learned area map stored in a storage part 37 to transmit the area as a prediction area map of accident occurrence to the on-vehicle device 61. The on-vehicle device 61 makes notification to the vehicle 6 having the on-vehicle device 61 by displaying the received prediction area map of accident occurrence on a liquid crystal display panel held by the on-vehicle device 61."

CITATION LIST

Patent Literatures

PTL 1: JP 2010-287093 A
PTL 2: JP 2010-211301 A

SUMMARY OF INVENTION

Technical Problem

For generation of a path, PTL 1 describes a method for generating a trajectory with safety ensured, in particular, by pessimistic evaluation, but does not describe operations in the event of a failure in a recognition device or a planning device.

PTL 2 describes a method for determining a dangerous position in the event of interruption of communication and issuing a warning, but does not describe a method for generating a trajectory with safety ensured in the event of a failure in a recognition device or a planning device mounted in a vehicle.

An object of the present invention is to provide a high-safety vehicle control system and action plan system.

Solution to Problem

One of preferred modes of the invention for solving the aforementioned problems can be carried out by the use of a technical idea described in the claims, for example.

Advantageous Effects of Invention

According to the invention, a high-safety vehicle control system and action plan system can be provided.

BRIEF DESCRIPTION OF DRAWINGS

FIG. 18 illustrates a screen output example of an output device 7.
FIGS. 19(a) and 19(b) illustrate notification information on emergency trajectory patterns.

DESCRIPTION OF EMBODIMENTS

Preferred embodiments of the present invention (examples) will be explained below. The examples will be mainly explained in relation to a vehicle control system in a vehicle system and can be suitably carried out in the vehicle system but do not disturb the application to systems other than the vehicle system.

First Example

<Configuration of Vehicle Control System>

Figure 2:
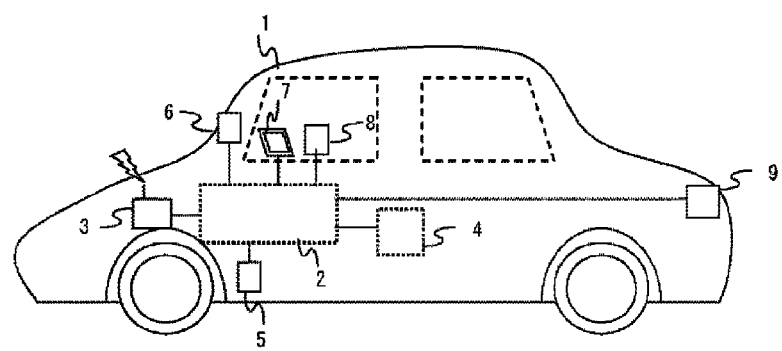
FIG. 2 illustrates an example of a system.

FIG. 2 illustrates an overview of a system having a vehicle control system of this example. Reference sign 1 represents a vehicle system internally having a vehicle control system for automobiles or the like; 2 represents a vehicle control system composed of an in-vehicle network (controller area network (CAN), CAN with flexible data-rate (CANFD), Ethernet (registered trademark), or the like) and a controller (Electronic Control Unit (ECU), or the like); 3 represents a communication device that performs wireless communications (cellular phone communications or communications using a protocol such as a wireless LAN or a WAN) with the outside of the vehicle system 1, performs wireless communications to acquire and transmit information on the outside (an infrastructure or other vehicles) or information on an own vehicle, or performs wired communications with the vehicle control system 2 via wired connection using an on-board diagnostic (OBD) terminal, an Ethernet terminal, an external recording medium (for example, a USB memory, an SD card, or the like) or the like; 4 represents a vehicle control system composed of a network with the use of a protocol different from that for the vehicle control system 2 or the same protocol as that for the vehicle control system 2; 5 represents a drive device such as an actuator that drives a machine or an electric device controlling vehicle motion (for example, an engine, a transmission, a wheel, a brake, a steering gear, or the like) under control of the vehicle control system 2; 6 represents a recognition device composed of a camera, a radar, an LIDAR, external sensors including an ultrasound sensor that acquire information input from the outside and generate outside recognition information as described later, and dynamical system sensors that recognize the status of the vehicle system 1 (motion state, positional information, and the like) (acceleration, wheel speed, and global positioning system (GPS)); 7 represents an output device such as a liquid display, a warning light, or a speaker that is connected to a network system in a wired or wireless manner to receive data from the network system, and displays or outputs necessary information such as message information (for example, video and sound); 8 represents an input device such as a steering, a pedal, buttons, a lever, or a touch panel for the user to generate an input signal for inputting the user's intention or instruction for operations and provide the same to the vehicle control system 2; and 9 represents a notification device such as a lamp, an LED, or a speaker for the vehicle system 1 to notify the vehicle states and the like to the outside.

The vehicle control system 2 is connected to the vehicle control system 4, the wireless communication unit 3, the drive device 5, the recognition device 6, the output device 7, the input device 8, the notification device 9, and the like to transmit and receive information.

Figure 3:
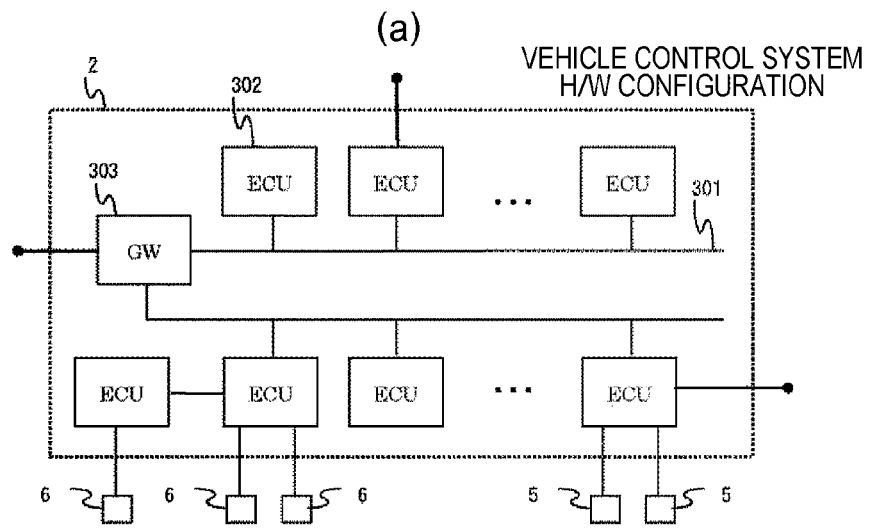
FIG. 3 illustrates an internal configuration example of a vehicle control system.

FIG. 3 illustrates a hardware (H/W) configuration example of the vehicle control system 2. Reference sign 301 represents a network link that connects network devices on an in-vehicle network and is a network link such as a CAN bus, for example; 302 represents an electronic control unit (ECU) that is connected to the network link 301 and network links other than the network link 301 such as the drive device 5 and the recognition device 6 (including dedicated lines) to control the drive devices 5 and the recognition devices 6, acquire information from the drive devices 5 and the recognition devices 6, and transmit and receive data over the network; and 303 represents a gateway (hereinafter, called GW) that connects a plurality of network links 301 to transmit and receive data over the individual network links.

Network topology examples include a bus type in which a plurality of ECUs is connected to two buses as illustrated in FIG. 3, a star type in which a plurality of ECUs is connected directly to the GW, a link type in which ECUs are connected in a ring form to a series of links, a mixture type composed of a plurality of networks with a mixture of the foregoing types, and others. For the GW 303 and the ECU 302, there are an ECU having the GW function and a GW having the ECU function.

The ECU 302 performs control processes such as outputting a control signal to the drive device 5, acquiring information from the recognition device 6, outputting a control signal and information to the networks, and changing the internal states.

Figure 4:
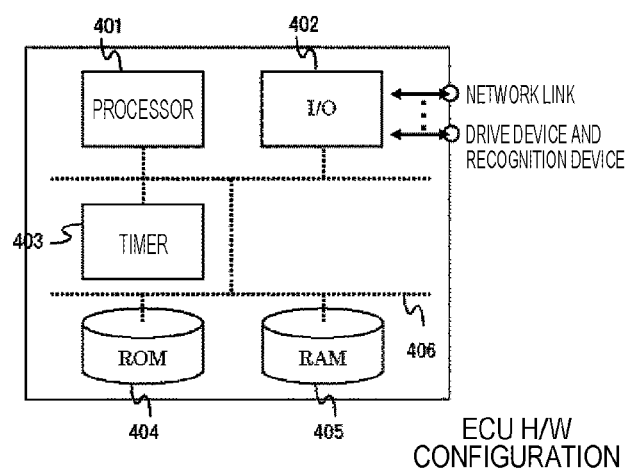
FIG. 4 illustrates a configuration example of a controller.

FIG. 4 illustrates an example of internal configuration of the ECU 302 or the GW 303 as a network device according to the present invention. Reference sign 401 represents a processor such as a CPU that has a storage element such as a cache or a register and executes a control; 402 represents an input/output (I/O) that transmits and receives data to and from the drive device 5 or/and the recognition device 6 connected via the network link 301, a network, or a dedicated line; 403 represents a timer that uses a clock or the like not illustrated to manage the time and hour; 404 represents a read only memory (ROM) that saves programs and non-volatile data; 405 represents a random access memory (RAM) that saves volatile data; and 406 represents an internal bus for use in communication within the ECU.

Figure 5:
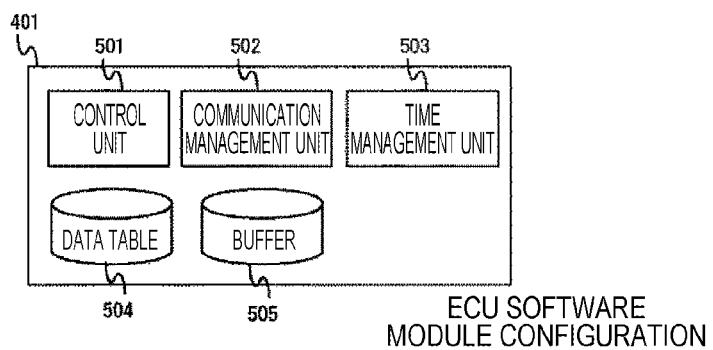
FIG. 5 is a software module configuration example of the controller.

Next, FIG. 5 illustrates a configuration of software modules operating in the processor 401. Reference sign 502 represents a communication management unit that manages the operations and states of the communication I/F 402 and provides an instruction to the communication I/F 402 via the internal bus 406; 503 represents a time management unit that manages the timer 403 to acquire and control time-related information; 501 represents a control unit that analyzes data acquired from the communication I/F 402 and controls all the software modules; 504 represents a data table that holds information on an outside recognition map described later and the like; and 505 represents a buffer that secures data temporarily.

The configuration illustrated in FIG. 5 indicates operational concepts in the processor 401. The processor 401 operates by acquiring the information necessary for operations as appropriate from the ROM 404 and the RAM 405 or writing the same as appropriate into the ROM 404 and the RAM 405.

The functions of the vehicle control system described later are performed by the control unit 501.

<Functional Configuration Example of Vehicle Control System>

Figure 6:
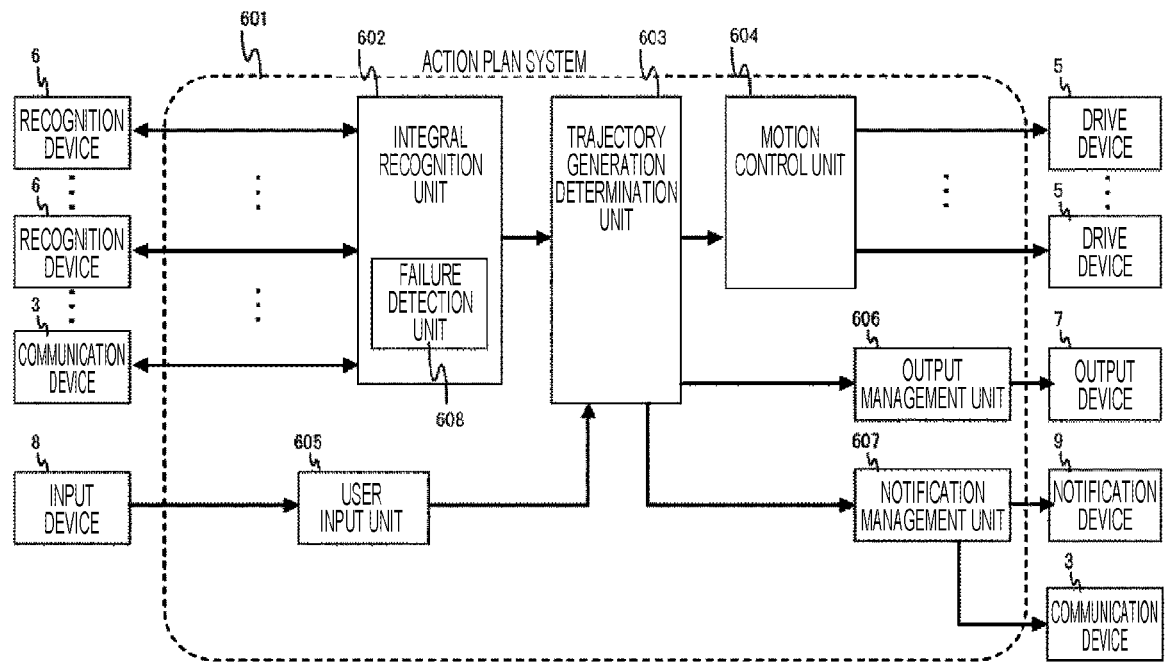
FIG. 6 illustrates a configuration example of an action plan system.

FIG. 6 illustrates a functional configuration example of the vehicle control system.

Reference sign 601 represents the entire action plan system according to the present invention. Reference sign 602 represents an integral recognition unit that integrates outside recognition information output from a plurality of recognition devices 6 to generate an outside recognition map described later and has a failure detection unit 608 described later to generate an outside recognition map in the event of a failure described later; 603 represents a trajectory generation determination unit 603 that generates a trajectory, provides an instruction for motion control to a motion control unit 604, provides an instruction for output to an output management unit 606, or provides an instruction for notification to a notification management unit 607, based on a determination from the outside recognition map generated by the integral recognition unit 602 and the user input from a user input unit 605; 604 represents a motion control unit that controls a plurality of drive devices 5 according to the instruction for motion control from the trajectory generation determination unit 603; 605 represents a user input unit that generates the user's instructive information according to the input from the input device 8; 606 represents an output management unit that provides an instruction for output to the output device according to the output from the trajectory generation determination unit 603; 607 represents a notification management unit that provides an instruction for notification to the notification device 9 according to the output from the trajectory generation determination unit 603; and 608 represents a failure detection unit that detects a failure occurring in the recognition device 6 or in a communication path between the recognition device 6 and the integral recognition unit 602.

All or combinations of some of the integral recognition unit 602, the trajectory generation determination unit 603, the motion control unit 604, the user input unit 605, the output management unit 606, and the notification management unit 607 are also called an action plan system. The action plan system may include some or all of the drive devices 5, the recognition device 6, the output device 7, the input device 8, and the notification device 9.

Figure 7:
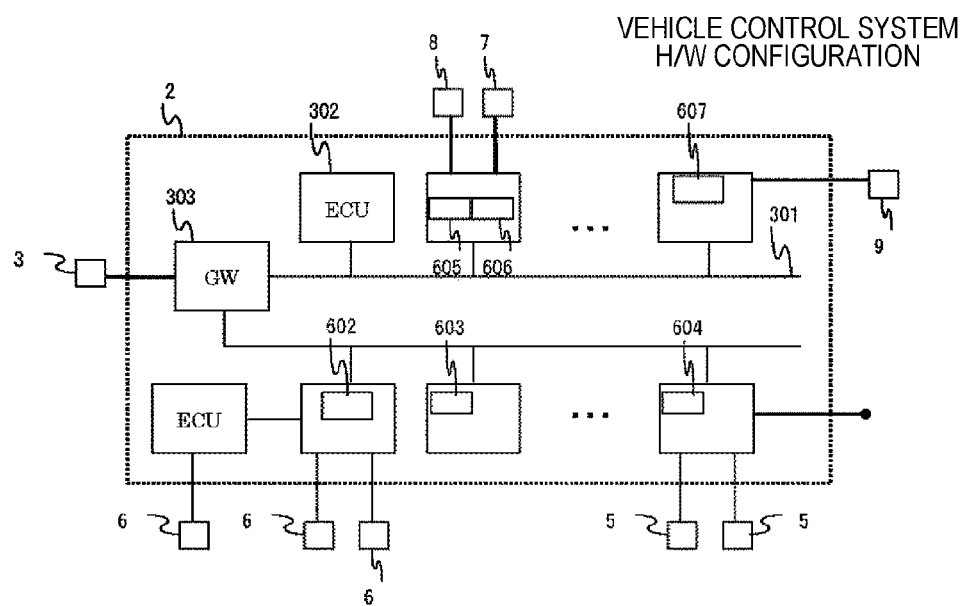
FIG. 7 illustrates an arrangement example of the action plan system in the vehicle control system.

The action plan system 601 includes a plurality of functions. There is a plurality of functional arrangement patterns in the H/W illustrated in FIG. 3. FIG. 7 illustrates an example of arrangement. However, the functional arrangement is not limited to this but the individual functions may be arranged in an ECU other than that illustrated in the drawing. For example, the integral recognition unit 602 and the trajectory generation determination unit 603 may be arranged in the same ECU. Arranging the functions in the same ECU would facilitate communications between the functions to achieve high-speed processing. In addition, arranging the functions in different ECUs could protect the individual functions from the risk of a common cause failure due to an H/W failure to achieve high-reliable processing.

Figure 1:
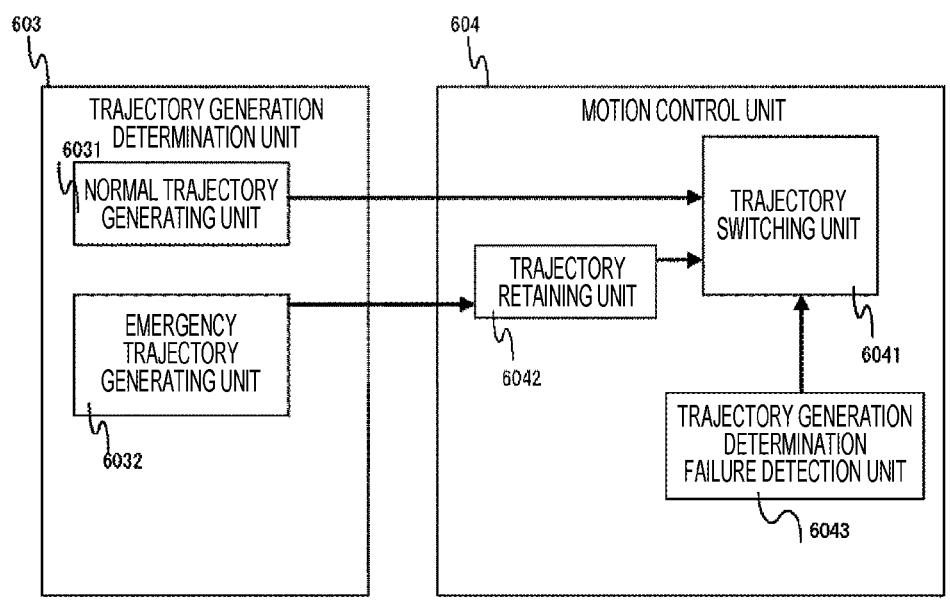
FIG. 1 illustrates internal configuration examples of a trajectory generating unit and a motion control unit.

The trajectory generation determination unit 603 and the motion control unit 604 include a plurality of functions described in FIG. 1. The trajectory generation determination unit 603 has a normal trajectory generating unit 6031 and an emergency trajectory generating unit 6032. The motion control unit 604 has a trajectory switching unit 6041, a trajectory retaining unit 6042, and a trajectory generation determination failure detection unit 6043. The trajectory generation determination failure detection unit 6043 may be arranged in a unit other than the motion control unit.

The individual functions will be described later.

<Outside Recognition Method>

The kinds of the recognition devices 6 are as described above in relation to the configuration of the vehicle control system. The recognition devices 6 acquire outside recognition information described later on operating principles according to the kinds of the recognition devices. Mainly, the sensors in the recognition devices 6 acquire physical measurement values in the outside, and acquire outside information by applying a specific algorithm (for example, an image recognition algorithm for acquired images) to the measurement values.

For the individual recognition devices, the measurable ranges are decided in advance (for example, for a camera, shooting direction, vertical and lateral angles, and far distance recognition limit by the number of pixels, and for a radar, radio emission angle, radio reception angle, and distance), or are measured and decided with adjustment (calibration) to changes according to the environments. Combining the outside information acquired by the individual recognition devices makes it possible to check the situations in the outside of the vehicle control system 2.

Figure 8:
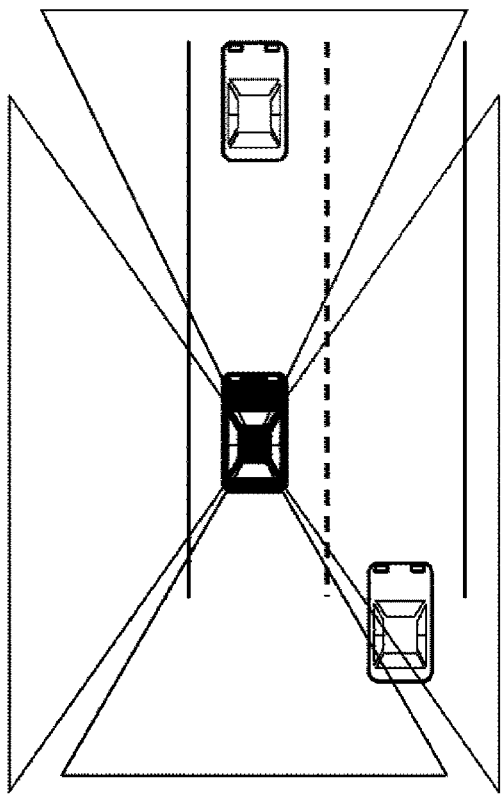
FIG. 8 illustrates an example of outside recognition.

FIG. 8 illustrates an example of outside recognition. In this example, the recognition devices 6 of the vehicle system 1 in four directions acquire the outside information. The outside recognition information output from the recognition devices 6 allows the integral recognition unit 602 to check what objects exist in the neighborhood.

The outside recognition information can also be acquired from the communication device 3 in the same manner. As the information acquired by the communication device 3, the outside recognition information on objects existing behind a shielding matter such as in hiding places, for example, that would not be capable of being observed by the recognition devices 6 is mainly acquired together with positional information to allow the positions of the objects to be checked.

In the outside recognition, the recognition devices 6 cannot surely recognize all objects, and therefore there are regions where it is not certain what objects exist (uncertain regions). In that case, the uncertainty and the reliability of existence of objects are represented by existence probability described later.

<Outside Recognition Information>

The outside recognition information is information representing objects that exist outside the vehicle system and have been observed by the recognition devices 6. For example, the outside recognition information includes: object type (stationary objects (walls, white lines, traffic lights, separating zones, trees, and others), dynamic objects (pedestrians, cars, motor cycles, bicycles, and others), the possibility of driving (entry into regions), and other attribute information), information on relative positions of objects (directions and distances), information on absolute positions of objects (coordinates and others), the speeds and orientations of objects (moving directions, face orientations), acceleration, existence probability (certainty), the time of measurement of the outside recognition information, IDs of the recognition devices 6 having performed measurements, and others.

As a calculation method of existence possibility, the probability of existence is increased when the existence is determined as certain by incorporating the results of computation of certainty by an algorithm for object determination in the recognition devices 6 and the results of time-series observation (on whether an object of the same type exists in the same position for a short time). According to the method, it is possible to increase the possibility that objects can be correctly determined based on the observed outside recognition information.

In addition, holding the information on the time when the outside recognition information was measured makes it possible to generate an outside recognition map in which a plurality of units of outside recognition information is in time synchronization with one another. Further, even in the event of a failure, when the outside recognition information is not updated afterward, the latest state (latest position and latest observation time) before the occurrence of the failure can be grasped to predict a subsequent action. In addition, when the time of occurrence of the failure in the recognition device 6 is known, it is possible to rely on only the outside recognition information before the occurrence of the failure from the failed recognition device 6.

Each outside recognition information includes the recognition device ID indicating which of the recognition devices 6 has generated the outside recognition information. Accordingly, in the event of a failure in any of the recognition devices, it is possible to check which of the outside recognition information was output from the failed recognition device 6.

<Outside Recognition Map>

Figure 9:
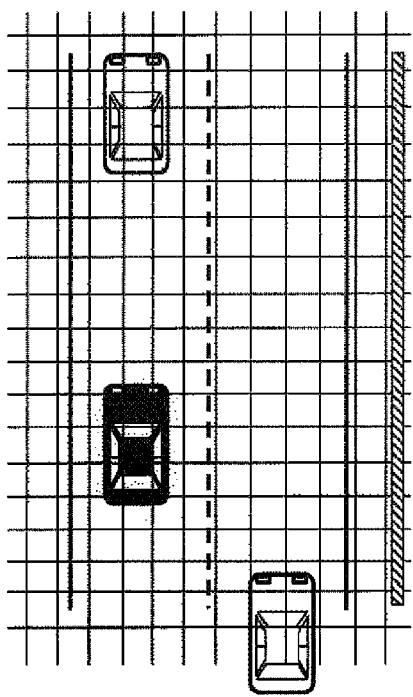
FIGS. 9(a) and 9(b) illustrate an example of outside recognition map.
Figure 9:
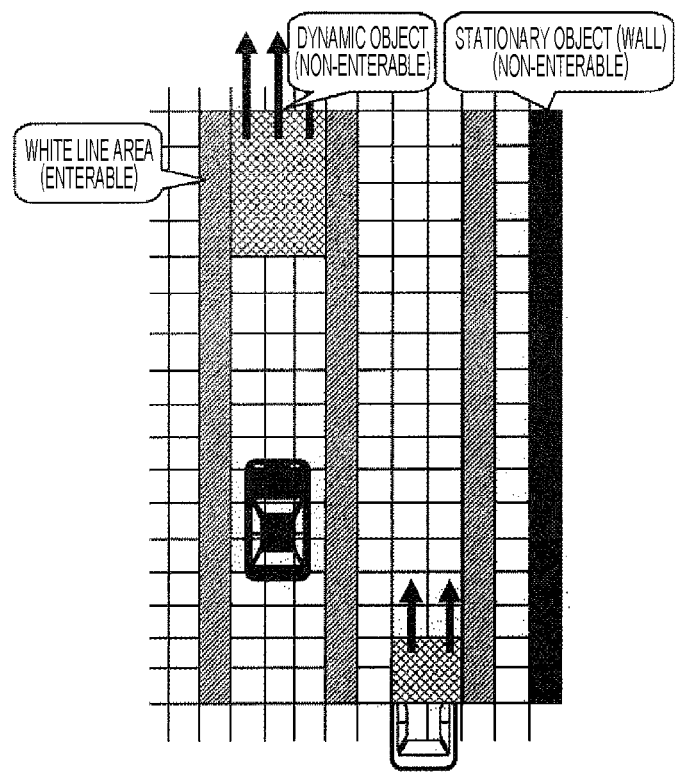

The integral recognition unit 602 generates integral recognition information (e.g. an outside recognition map) in which the outside recognition information from the plurality of recognition devices 6 is integrated. FIGS. 9(*a*) and 9(*b*) illustrate an example of outside recognition map. FIG. 9(*b*) illustrates an example in which object information is arranged in individual regions of an orthogonal coordinate system (grid) (FIG. 9(*a*)). The object information is obtained by removing the positional information from the outside recognition information described above, for example, and is arranged in the individual grid regions.

In the case where there exists a plurality of object information in the same grid region (for example, the plurality of recognition devices 6 observes the same grid square position), the existence probability is increased when the object information can be recognized by the plurality of recognition devices, for example. In contrast, when the object information cannot be recognized by the plurality of recognition devices observing the same grid region, the existence probability is decreased to enhance the recognition accuracy. When there is no match between the outside recognition information, the outside recognition information with a higher probability is prioritized and the probability of the object information in the grid region is decreased. Accordingly, when the plurality of recognition devices recognizes different information, it is possible to decrease the probability and lower the reliability of the information.

Figures 10, 11:
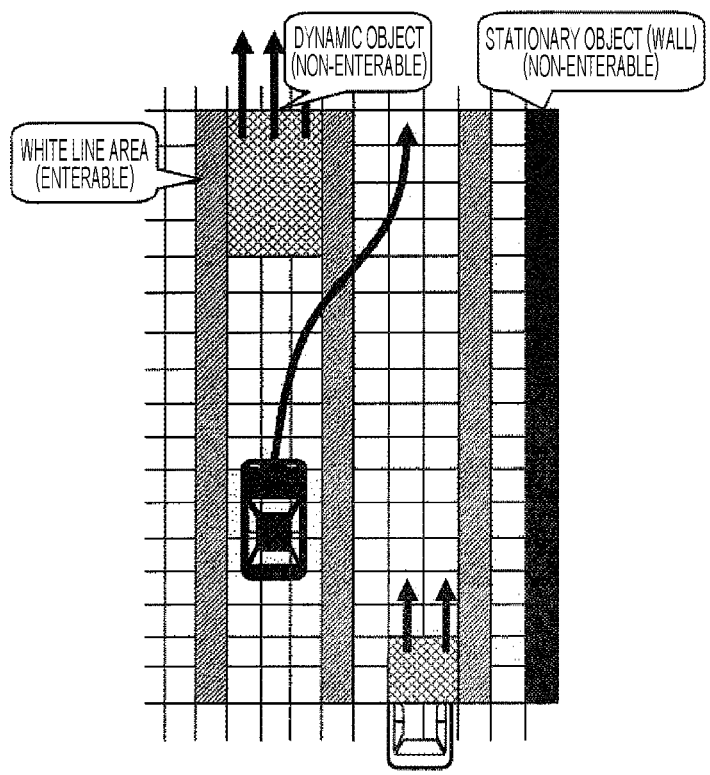
FIG. 10 illustrates an example of a list form of outside recognition map.
FIG. 11 illustrates an example of trajectory generation based on the outside recognition map.

As a method of representing the outside recognition map other than the grid representation, a list-form method is used to make a list of recognized objects. FIG. 10 illustrates an example of list-form representation. Reference sign 1001 represents the entire outside recognition map in list form. Holding the outside recognition map in list form as described above makes it possible to reduce the data amount as compared to the grid form.

<Action Prediction>

The outside recognition map can be generated not only by using the currently observed outside recognition information but also by making prediction (action prediction) from the past outside recognition information. For example, there is a high possibility that a stationary object remains in the same position (the same position on the road surface, not the position relative to the vehicle) after a lapse of a specific period of time. In addition, the position of a dynamic object after a specific period of time can be predicted from the last position, speed, acceleration, and others. Using the predicted outside recognition information as described above makes it possible to predict information on the positions of objects that currently cannot be observed.

Action prediction can be made by the integral recognition unit 602 based on the outside recognition map. Alternatively, for example, the recognition devices 6 may add future prediction information to the outside recognition information and transmit the same to the integral recognition unit 602. In that case, the recognition devices 6 make prediction to reduce the amount of computation related to the action prediction by the integral recognition unit 602. As an alternative method, the trajectory generation determination unit 603 may make necessary action prediction of the objects from the current outside recognition map. Accordingly, it is possible to reduce the load of communication from the integral recognition unit 602 to the trajectory generation determination unit 603 and make action prediction of only objects necessary for trajectory generation and determination.

<Trajectory Generation>

A method of trajectory generation based on the outside recognition map will be explained. The trajectory is generated in such a manner as to satisfy safety constraints under which the vehicle system can run safely (e.g. there is a low possibility of a collision with other obstacles), and motion constraints on acceleration, deceleration, and yaw rate that can be fulfilled by the vehicle system.

In the outside recognition map in the example of FIG. 9(*b*), an example of generating a trajectory in which the subject vehicle moves into the right lane will be explained with reference to FIG. 11. In this example, another running vehicle exists in the right lane but the subject vehicle runs at a higher speed and can make a lane change. First, the subject vehicle generates a trajectory for moving into the right lane while satisfying the motion constraints. Then, it is determined on the generated trajectory whether there will not occur a collision between the predicted trajectory of another dynamic object (for example, the position of the object after a specific period of time at the current speed and the presumed acceleration) and the trajectory of the subject vehicle. When it is not determined that there will occur a collision, the subject vehicle is controlled based on the trajectory of the subject vehicle. When it is determined that there will occur a collision, calculations are performed again or another trajectory satisfying the motion constraints is generated after a lapse of a specific period of time, and then the safety constraints are calculated in the same manner.

To calculate the safety constraints, there are a method by which to set areas assumed from the current speed and the presumed acceleration or deceleration of the dynamic object as non-approachable areas as described above (non-approachable area method) and a potential map method by which to calculate risks in the areas from the types, speeds, and moving directions of the objects to determine risk potentials. In the case of using the potential map method, the trajectory is generated from one of the generated potential maps that is lowest in potential and has no entry into potential areas with a specific value or higher ones so as to satisfy the motion constraints of the subject vehicle.

The action prediction of the dynamic objects is necessary in the non-approachable areas. For the action prediction, there is a method by which to set specific areas centered on points moved at the current speed and acceleration and in the current direction as non-approachable areas. Setting specific areas as non-approachable areas as described above eliminates the need for calculations based on complicated predictions.

As described above, the trajectory is generated based on the moving direction of the vehicle, the motion constraints, and the safety constraints. The trajectory generation determination unit 603 transmits trajectory information based on the generated trajectory to the motion control unit 604, and the motion control unit 604 controls the drive device 5 based on the trajectory information to control the motion of the vehicle system.

<Failure Determination of Recognition Device>

A method of determination of a failure in the recognition device 6 will be explained. The integral recognition unit 602 communicates with the recognition device 6 via a communication path such as a network or a dedicated line to determine the presence or absence of a communication failure. The failure in the communication path can be determined by the impossibility of communications (an error response is made in the communication process, or the potential of the signal line is abnormal), abnormal signal value in the communication (e.g., a CRC mismatch, inconsistent fixed data patterns), and the like. For the failure in the communication path, a communication path other than the one for transmitting the outside recognition information may be provided so that the failure in the communication path for transmitting the outside recognition information can be notified by the other communication path.

Failures in the recognition device 6 include the situations in which data sent at a constant frequency does not arrive or arrive with a delay, a fixed data pattern cannot be received (the first bit is always 1, or there is a CRC mismatch, or the like), no response is made despite a request for data transmission, and the like.

Besides the foregoing determination methods, failure determination can be made based on the behavior of the transmission data. For example, even though any abnormality occurs in the behavior of the outside recognition information, such as when an object performs an unexpected action (for example, the object moves at a moving speed beyond the physical limit of the object type that is not assumed to be output from the recognition device 6), an object appears or disappears out of the probability range, any undefined parameter is generated, or the like, the recognition device 6 having output the outside recognition information on the object with the abnormal behavior is treated as the source of the failure, and a failure range described later is determined.

In addition, the recognition device 6 may notify its own failure to the integral recognition unit 602. In particular, when a recognition function failure (abnormality in a sensor device or the like) occurs in a specific region, the recognition device 6 can notify the failure in the specific region when it can determine the failure. In that case, the specific region can be used for determination of the failure range described later.

From the failure determination results, it is possible to determine in which of the recognition devices 6 the failure has occurred and identify the failure occurrence range where the recognition is impossible.

In particular, when the occurrence of a failure is detected from the behavior, it is determined that the time of the failure occurrence is earlier than the receipt of the outside recognition information with the abnormal behavior, and the subsequent outside recognition information is not used but discarded. This makes it possible to prevent an incorrect trajectory from being generated from the incorrect outside recognition information after the occurrence of the failure.

The time of the failure occurrence in the recognition device 6 may be processed on the assumption that the failure occurred before a specific period of time after the detection of the failure at design time. For example, with regard to the time as T when it was determined that a failure has occurred based on the failure determination method (for example, interruption of communications), the time of the failure occurrence time is designated as T−a (a represents a designed value, for example, a presumed time between the occurrence of the failure and the interruption of communications), and all the subsequent outside recognition information output from the failed recognition device 6 is discarded. This makes it possible to lengthen the time between the detection of occurrence of a failure and the notification of the failure by the recognition device 6 (reduce a load of failure detection process), and prevent the integral recognition unit 602 from performing the process based on the incorrect outside recognition information.

<Failure Determination by Trajectory Generation Determination Unit>

A method of failure determination by the trajectory generation determination unit 603 as an operation of the trajectory generation determination failure detection unit 6043 will be explained. The motion control unit 604 communicates with the trajectory generation determination unit 603 via a communication path such as a network or a dedicated line to determine the presence or absence of a communication failure. The failure in the communication path can be determined by the impossibility of communications (an error response is made in the communication process, or the potential of the signal line is abnormal), abnormal signal value in the communication (e.g., a CRC mismatch, inconsistent fixed data patterns), and the like. For the failure in the communication path, a communication path other than the one for transmitting the trajectory information may be provided so that the failure in the communication path for transmitting the trajectory information can be notified by the other communication path.

Failures in the trajectory generation determination unit 603 include the situations in which data sent at a constant frequency does not arrive or arrive with a delay, a fixed data pattern cannot be received (the first bit is always 1, or there is a CRC mismatch, or the like), no response is made despite a request for data transmission, and the like.

Besides the foregoing determination methods, failure determination can be made based on the behavior of the transmission data. For example, even though any abnormality occurs in the behavior of the trajectory information, such as when an object performs an unexpected action (for example, the object moves at a moving speed beyond the physical limit of the object type that is not assumed to be output from the trajectory generation determination unit 603), an object appears or disappears out of the probability range, any undefined parameter is generated, or the like, the trajectory plan determination unit 603 having output the vehicle trajectory information with the abnormal behavior is treated as the source of the failure, and the failure range described later is determined.

In addition, the trajectory plan determination unit 603 may notify its own failure to the motion control unit 604. In particular, when a failure occurs in an electronic circuit or the like (abnormality in a sensor device or the like) of the trajectory plan determination unit 603, the trajectory plan determination unit 603 can transmit the failure when it can determine the failure.

From the failure determination results, it is possible to determine whether a failure has occurred in the trajectory plan determination unit 603.

The time of the failure occurrence in the trajectory plan determination unit 603 may be processed on the assumption that the failure occurred before a specific period of time after the detection of the failure at design time. For example, with regard to the time as T when it was determined that a failure has occurred based on the failure determination method (for example, interruption of communications), the time of the failure occurrence time is designated as T-a (a represents a designed value, for example, a presumed time between the occurrence of the failure and the interruption of communications), and all the subsequent trajectory information output from the failed trajectory plan determination unit 603 is discarded. This makes it possible to lengthen the time between the detection of occurrence of a failure and the notification of the failure by the trajectory plan determination unit 603 (reduce a load of failure detection process), and prevent the motion control unit 604 from performing the process based on the incorrect trajectory information.

<Failure in Recognition Determination Unit>

When the failure detection unit 604 has determined a failure in the recognition device 6 or the trajectory generation determination failure detection unit 6043 has determined a failure in the trajectory generation determination unit 603, the vehicle control system 4 becomes incapable of performing action prediction or trajectory generation. This state is regarded as a failure in the recognition determination unit, and the failure detection unit 604 and the trajectory generation determination failure detection unit 6043 are called recognition determination unit failure detection unit.

<Generation of Emergency Trajectory>

An emergency trajectory for use in case that a failure in the recognition determination unit occurs or the generation of a new trajectory becomes incapable will be explained. The trajectory generation determination unit 603 has an emergency trajectory generating unit 6032 to calculate an emergency trajectory for driving in a specific period of time in the event of a failure in the trajectory generation determination unit 603 or the outside recognition unit.

In the event of a failure in the trajectory generation determination unit 603 or the like, the trajectory information necessary for the motion control unit 604 cannot be updated. Accordingly, the trajectory generation determination unit 603 needs to calculate a safe trajectory until the emergency trajectory comes to an end.

For the safe trajectory, there is a path in which the possibility of a collision with another vehicle is almost zero until the end of the emergency trajectory, for example. An example of a path in which the possibility of a collision is almost zero may be a path in which other vehicles' trajectories for use in the action prediction are predicted and the subject vehicle runs in a driving area into which the other vehicles do not enter. Another path in which the possibility of a collision is almost zero may be a path that exists in a driving area into which no vehicles enter when driving under the road traffic acts, for example.

As another example of a safe trajectory, there is a path in which the subject vehicle slows down naturally. By decelerating the subject vehicle with the use of the function of outputting the vehicle state to the user and notifying the same to the outside of the vehicle as described later, it is possible to notify the current failure in the subject vehicle to the following vehicles and prompt them to avoid and pass by.

As still another example of a safe trajectory, there is a path in which the subject vehicle runs toward a safety stop area such as a road shoulder where the subject vehicle can stop in safe, and then stops there. Slowing down and stopping in a section other than driving lanes makes it possible to avoid a collision with other vehicles.

As still another example of a safe trajectory, there is a sudden stop. In the event of a failure in the subject vehicle, not driving it is considered as safe. Accordingly, the subject vehicle is suddenly braked and brought into a stop in the shortest time. However, when other vehicles are driving at high speeds on an expressway or the like, the subject vehicle can be stopped more safely by predicting that there is no following vehicle by the action prediction method described above.

As still another example of a safe trajectory, there is a path in which the subject vehicle continues to run in the same driving lane. For example, even though the subject vehicle is slowed down by natural deceleration on the scene, when the subject vehicle continues to run straight ahead and then the driving lane is curved, the subject vehicle may run off the lane and collide the wall surface or the like, for example. Accordingly, driving continuously along the same lane makes it possible to avoid an accident due to a collision with the wall surface caused by running off the lane.

<Trajectory Retaining Unit>

A method of trajectory retention by which to retain emergency trajectory used when no trajectory can be newly generated due to a failure in the outside recognition function, the trajectory generation determination unit 603, or the like will be explained.

In the event of a failure in the outside recognition function or the trajectory generation determination unit 603, the motion control unit 604 needs to control the driving unit by the use of the emergency trajectory. Accordingly, the motion control unit 604 has a trajectory retaining unit 6042.

The trajectory retaining unit 6042 receives the trajectory information on the emergency trajectory from the motion control unit 604 and retains the same.

The trajectory retaining unit can save the trajectory information in a random access memory (RAM) saving volatile data, an electrically erasable programmable read only memory (EEPROM) as a rewritable non-volatile memory, or the like, to read and write the trajectory information <Trajectory Information>

Figure 12:
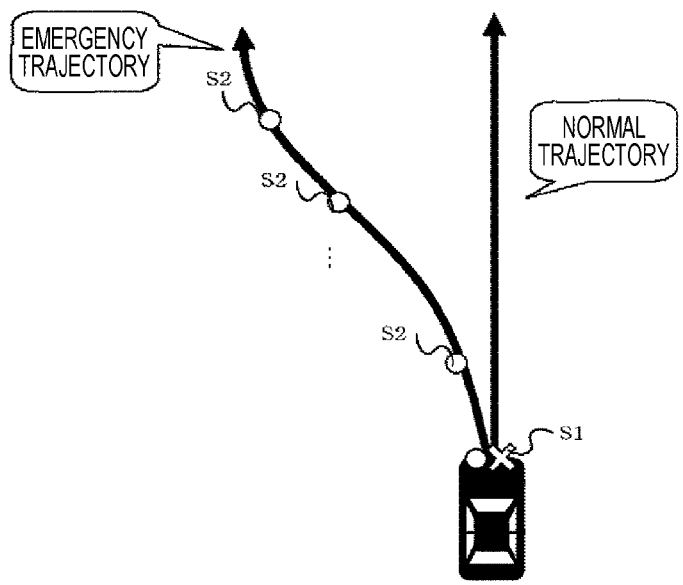
FIGS. 12(a) to 12(c) illustrate examples of trajectory information.

FIGS. 12(*a*) to 12(*c*) describe the trajectory information. FIG. 12(*a*) illustrates an example of a normal trajectory and an emergency trajectory. In the example, there are two or more trajectories including a normal trajectory for normal time and an emergency trajectory to be generated in the process of emergency trajectory generation described above. Each of the trajectories is sent as trajectory information (S1, S2) at an arbitrary resolution from the recognition generation determination unit 603 to the motion control unit 604.

FIG. 12(*b*) describes a format of trajectory information. As the trajectory information, information on which the motion control unit can calculate a control is inserted. An example of information on which a control can be calculated is described in the drawing. The control information includes [acceleration and yaw rate]. Increase or decrease in speed in the front-back direction is instructed by the acceleration and increase in speed in the right-back direction is instructed by the yaw rate. As another example of information on which a control can be calculated is [speed and steering angle]. The target speed from the current speed is calculated and increase or decrease in speed is calculated by the speed. The target direction of the vehicle is specified and the angles of the tires are changed by the steering angle. Still another example is [coordinates]. For an example of coordinates, there is a specification method by which to specify coordinates as [x coordinate, y coordinate] or [10 m forward, 5 m leftward], but the specification method is not limited to this. The motion control unit performs calculations in the front-back direction and the lateral direction for movement to the target coordinates and controls the drive device. Using the coordinate information allows a control with the use of a difference in coordinate information. The difference in the coordinate information is a difference between the actual coordinate information and the specified coordinate information caused by a deviation from the target control because the vehicle cannot move according to the instructed values due to road conditions, crosswind, or the like. Using the difference in the coordinate information makes it possible to, even when the vehicle takes a trajectory different from the calculated one, return the vehicle to the calculated trajectory.

Still another example of information on which a control can be calculated is [instruction value for each drive wheel]. Examples of instruction value for each drive wheel may include acceleration or speed, or acceleration and wheel angle. The drive device can control the acceleration and the angle of each tire, and the motion control unit can calculate a control of the vehicle by moving the individual tires.

Adding number information to the trajectory information makes it possible to grasp the order in which the trajectory information was received. At the time of switching from the normal trajectory to the emergency trajectory, the number information can be checked to select the trajectory information on the emergency trajectory closest timewise to the last trajectory information on the normal trajectory, thereby making a transition with a minimum control deviation. In addition, trajectory information S1 on the normal trajectory and trajectory information S2 on the emergency trajectory may have the same instruction value or different instruction value. For example, specifying a control value of speed, acceleration, or the like for the trajectory information for normal time makes it possible to reduce a processing load because the motion control unit does not need to perform a control by the use of the difference in the coordinates. Using the coordinate information for trajectory information on the emergency trajectory allows the motion control unit to perform a control by the use of the difference in the trajectory at the time of a failure in the trajectory generation determination unit, and perform a more correct control after the failure in the trajectory generation determination unit.

In addition, for the trajectory information S2 on the emergency trajectory, the trajectory information for a plurality of times is retained in the trajectory retaining unit as described in FIG. 12(c). Accordingly, having the number information for identifying the trajectory information makes it possible to perform a motion control at each of the times.

<Trajectory Switching Unit>

The trajectory switching unit 6041 for switching from a control using the normal trajectory information to a control using the emergency trajectory information in the event of a failure in the trajectory generation determination unit 603 or the like will explained.

When the motion control unit 604 acquires the information on the failure in the trajectory generation determination unit 603 from the trajectory generation determination failure detection unit 6043, the trajectory switching unit 6041 instructs the trajectory retaining unit 6042 to output the trajectory information so that the trajectory switching unit 6041 can use the trajectory information from the trajectory retaining unit 6042. Upon receipt of the instruction from the trajectory switching unit 6041, the trajectory retaining unit 6042 sends the retained trajectory information on the emergency trajectory to the trajectory switching unit 6041.

When the user performs input from the output management unit 606 described later, the trajectory switching unit 6041 can switch from a control using the trajectory information to a control using the input from the user.

When the operation of the user input is a very short-time operation (for example, one second or shorter) such as pressing the brake pedal and then immediately releasing the same, if stopping the control based on the trajectory information would dissatisfy the safety constraints for the trajectory generation, the trajectory switching unit 6041 temporarily ignores the user input and performs the control based on the trajectory information. This avoids the risk of a collision with another obstacle that would be caused by stoppage of the control based on the trajectory information according to the input operation of the user with no intention of steering the vehicle.

By switching to the user's driving, the trajectory switching unit 6041 can calculate the operation of the drive device based on the input from the user input unit 605.

The trajectory switching unit 6041 allows the use of the trajectory information on the emergency trajectory in the event of a failure in the trajectory generation determination unit 603 or the like.

<Output of Vehicle State to User and Notification of the Same to Outside of Vehicle>

The vehicle control system 3 outputs the notification of the current vehicle state or the determination on failure in the recognition devices 6 to the user via the output device 7 in the trajectory generation determination unit or to the outside of the vehicle via the notification device 9 or the communication device 3. For example, in the event of a failure in any unit of the vehicle system 1, the vehicle control system 3 issues a warning to the user via the output device 7 by turning on a warning light or emitting a warning tone, or creating vibrations from a vibration device. In addition, the output device 7 outputs the remaining time for the emergency trajectory as time information to notify the user of the remaining time during which the vehicle can move in safety.

Alternatively, the vehicle control system 3 outputs a warning state by a lamp to the outside of the vehicle via the notification device 9 or the communication device 3, or outputs a warning sound or information on the failure by a speaker.

<Operation Input from User>

The vehicle control system 3 accepts an operation from the vehicle driver or passenger with the input device 8, and passes the operation information to the trajectory generation determination unit 603. For operation inputs from the user in the example, the input device 8 includes levers and switches for the steering wheel, the brake pedal, the accelerator pedal, the clutch pedal, and the side brake, levers and switches for the gearbox such as a gear shift lever, switches for main power supply or the like. The driver uses the input device 8 to perform a user operation input for changing the behavior of the vehicle (changing the steering angle, increase or decreasing the speed, or changing settings in the gearbox).

As explained above, the vehicle system can take action in safety even in the event of a failure in the recognition device 6 of the vehicle system or the action plan system. In particular, even when the running plan cannot be calculated due to a failure in the action plan system, it is possible to pass the operation over to the user or stop the operation by running in advance along a path for safety running.

Second Example

A vehicle control system in a second example according to the present invention will be explained. The second example is different from the first example in allowing a reduction in communication volume. The same components as those of the example explained above will be given the same reference signs as those of the foregoing example and descriptions thereof will be omitted below.

Figures 13, 14:
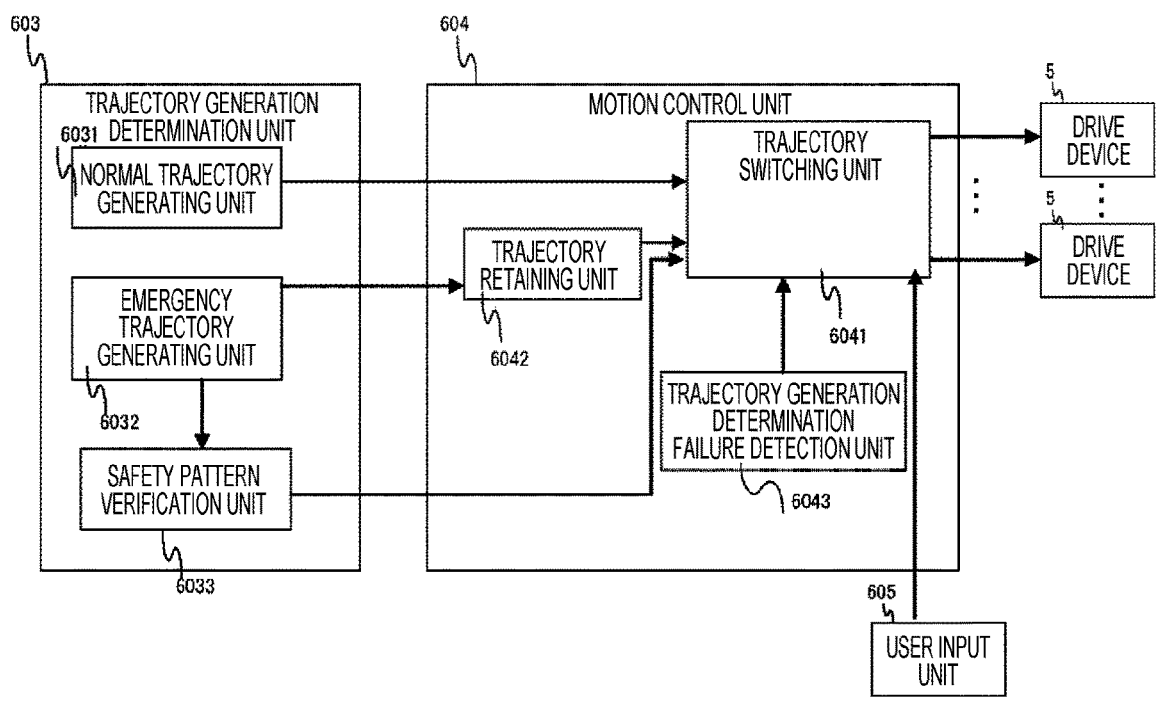
FIG. 13 illustrates an example in which information for transition is added to trajectory information.
FIG. 14 illustrates internal configuration examples of the trajectory generating unit and the motion control unit at the time of verification of a safety pattern.

Information for transition from the trajectory information on the normal trajectory to the trajectory information on the emergency trajectory is added to the trajectory information as described in FIG. 13. The trajectory generation determination unit determines whether the trajectory information on the emergency trajectory is safe and transmits the same to the motion control unit. When not determining that the trajectory information is safe, the trajectory generation determination unit calculates a new emergency trajectory. The emergency trajectory is safe only when the emergency trajectory satisfies safe trajectory conditions described above in relation to the emergency trajectory generating process.

As an example of information for transition, there is a method by which to add an actual time where a control is to be performed to the trajectory information. For example, the current time is added to the trajectory information on the normal trajectory and the future time is added to the trajectory information on the emergency trajectory as described in FIG. 13. In the event of a failure in the trajectory generation determination unit 603, the motion control unit 604 refers to the time information in the trajectory information on the normal trajectory received or processed immediately before to select from the trajectory retaining unit 6042 the trajectory information on the emergency trajectory having the future time information closest to the reference time or the time information closest to the reference time, and uses the selected information in the control. As another example of using the actual time, there is a method by which to add time information only to the trajectory information on the emergency trajectory. In the event of a failure in the trajectory generation determination unit 603, the motion control unit 604 selects the trajectory information on the emergency trajectory having the time information closest to the current time and uses the selected information in the control. As another information, numbers are added to the trajectory information. For example, in the case of transmitting the trajectory information in which the emergency trajectory is divided into 50 sections, the divided pieces are represented by numbers of 0 to 49. At that time, to send the trajectory information on the normal trajectory, the trajectory generation determination unit 603 adds to the trajectory information the numbers indicating which of the sections in the emergency trajectory corresponds to. In the event of a failure in the trajectory generation determination unit 603, the motion control unit 604 selects the trajectory information on the emergency trajectory having the number closest to the number for the trajectory information received or processed immediately before and uses the selected information in the control.

The emergency trajectory generating unit transmits the determination result that the emergency trajectory is safe to the trajectory retaining unit at any time or at a constant frequency or at an arbitrary time. Upon receipt of the determination result that the emergency trajectory is safe, the trajectory retaining unit continues to use the emergency trajectory in the trajectory retaining unit.

When not determining that the emergency trajectory is safe, the emergency trajectory generating unit calculates a new emergency trajectory, and transmits the trajectory information the generated emergency trajectory to the trajectory retaining unit immediately or at current transmission frequency. The trajectory retaining unit receives the trajectory information and updates the retained trajectory information.

Adding the information for transition to the trajectory information and determining by the trajectory generation determination unit at any time on the safety of the trajectory information on the emergency trajectory as described above makes it possible to decrease the number of times when the trajectory information on the emergency trajectory is transmitted and transmit the trajectory information by a smaller amount of communication.

In addition, a certain period of time is prepared for the emergency trajectory. Since the trajectory retaining unit has a plurality of emergency trajectories, the switching unit needs to select the emergency trajectory suited to the switching time. Accordingly, using the information for transition makes it possible to prevent the use of the emergency trajectory information and allow safer switching of the trajectory information. When there is no information for transition, the trajectory information close to the terminal end of the emergency trajectory or the trajectory information several seconds before may be used so that the vehicle may run in a trajectory on a time axis different from the presumed one.

Third Example

A vehicle control system in a third example according to the present invention will be explained. The third example is different from the first example in that it is possible to use always the trajectory information at the point in time when the emergency trajectory generating unit calculates the emergency trajectory. The same components as those of the example explained above will be given the same reference signs as those of the foregoing example and descriptions thereof will be omitted below.

In the example, the emergency trajectory generating unit of the trajectory generation determination unit 603 calculates the trajectory information on the emergency trajectory at the minimum frequency at which the control calculated by the motion control unit can be implemented (100 μs to 10 ms) or at any time, and transmits the same to the motion control unit.

The motion control unit 604 updates the emergency trajectory upon its receipt. Alternatively, the motion control unit transmits a request for transmission of the emergency trajectory to the emergency trajectory generating unit. Upon receipt of the request for transmission of the emergency trajectory, the emergency trajectory generating unit transmits the trajectory information on the emergency trajectory to the trajectory retaining unit. The trajectory retaining unit receives the emergency trajectory information and updates the same. The trajectory switching unit uses sequentially the leading one of the trajectory information in the trajectory retaining unit.

By updating the trajectory information at any time by the trajectory generation determination unit and updating the trajectory information by the motion control unit as described above, the trajectory retaining unit retains in the trajectory information the safe trajectory calculated by the emergency trajectory generating unit at the latest time. As time proceeds, it may be determined by the latest action prediction that the old emergency trajectory leads to a collision with another obstacle. Accordingly, the example makes it possible to reduce significantly the risk of a collision with another obstacle resulting from the use of the old emergency trajectory.

Fourth Example

A vehicle control system in a fourth example according to the present invention will be explained. The fourth example is different from the first example in that it is possible to reduce the volume of communications between the trajectory generation determination unit 603 and the motion control unit 604. The same components as those of the example explained above will be given the same reference signs as those of the foregoing example and descriptions thereof will be omitted below.

The trajectory generation determination unit 603 in the example retains a plurality of emergency trajectory patterns.

As examples of emergency trajectory patterns, for instance, there are a path generated in the emergency trajectory generation as described above in which the vehicle slows down naturally, a path in which the running speed and the steering angle are fixed until immediately before, and the like. The emergency trajectory patterns are represented by a plurality of units of trajectory information described in FIG. 18(*a*). The trajectory information on the emergency trajectory pattern has emergency trajectory pattern specific information 1901, transition order information 1902, and trajectory information control information 1903. With information for uniquely specifying the emergency trajectory patterns, the trajectory selection unit can select an arbitrary trajectory pattern retained by the trajectory retaining unit.

In the example, the emergency trajectory patterns are transmitted to the motion control unit 604 and are retained by the trajectory retaining unit 6042 when the system trajectory is started. Alternatively, the motion control unit may retain these emergency trajectory patterns before when the system trajectory is started.

In the example, a safety pattern verification unit 6033 illustrated in FIG. 14 evaluates the emergency trajectory patterns held in the emergency trajectory generating unit 6032 at any time or at specific time intervals. The trajectory generation determination unit can transmit to the motion control unit 604 information indicating that no operation is performed when there is no fear or there is a very low possibility of a collision with another vehicle or the like in the trajectories included in the emergency trajectory patterns or information indicating that there is no problem in the emergency trajectory patterns. In addition, when there is a fear or a very high possibility of a collision with another vehicle or the like in one of the trajectories included in the emergency trajectory patterns, the trajectory generation determination unit can transmit to the motion control unit 604 information for disabling the use of the emergency trajectory pattern with the fear of a collision. FIG. 19(*b*) describes information for disabling the use of the emergency trajectory pattern transmitted by the trajectory generation determination unit 603. The information for disabling the use of the emergency trajectory pattern includes emergency trajectory pattern specification information 1904 and emergency trajectory pattern use disabling determination result 1905.

In addition, when there is a fear or a very high possibility of a collision with another vehicle or the like in all the trajectories included in the emergency trajectory patterns, the trajectory generation determination unit calculates an emergency trajectory different from those in the emergency trajectory patterns, and transmits the same to the motion control unit 604. The motion control unit 604 retains the received emergency trajectory in the trajectory retaining unit 6042.

Transmitting initially the emergency patterns without a change in the trajectories and then transmitting only the safety determination results by the trajectory generation determination unit as described above, it is possible to reduce the total volume of communicated information as compared to the case in which the trajectory information is transmitted at any time.

When the motion control unit 604 retains the emergency trajectory patterns before when the system trajectory is started, the motion control unit 604 can control the drive device based on the trajectory information on the emergency trajectories even though the trajectory generation determination unit does not transmit the emergency trajectory plan.

The trajectory information on the emergency trajectories may have a very large amount of data, and all the data may not be completely transmitted due to a failure in the communication path during transmission. Retaining the emergency trajectory patterns by the trajectory retaining unit in advance allows the motion control unit to switch to the safe emergency trajectory retained in the trajectory retaining unit even in the event of a failure in the communication path.

Fifth Example

A vehicle control system in a fifth example according to the present invention will be explained. The fifth example is different from the first example in that the amount of calculation on the emergency trajectories is decreased. The same components as those of the example explained above will be given the same reference signs as those of the foregoing example and descriptions thereof will be omitted below.

Figure 15:
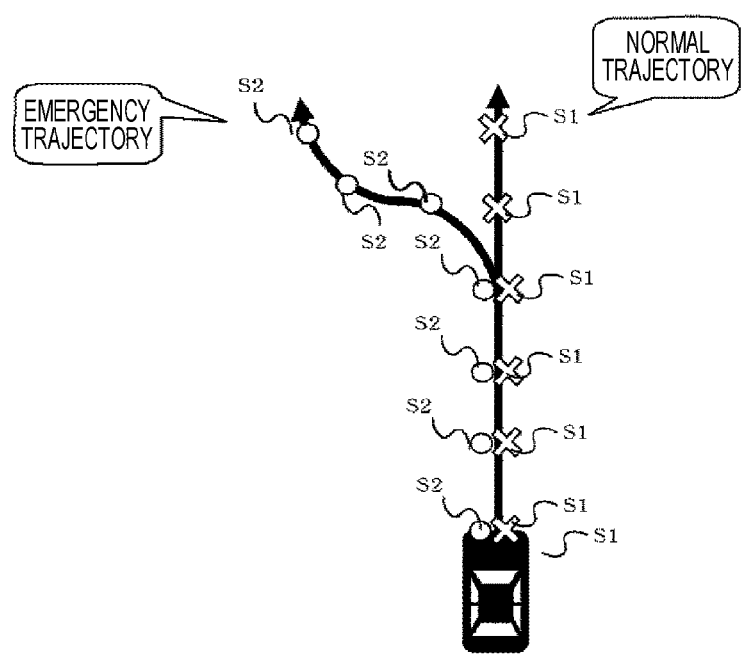
FIG. 15 illustrates a trajectory information example where a normal trajectory and an emergency trajectory have the same path.

The path of an emergency trajectory calculated by the trajectory generation determination unit in the example coincides partway with the path of the normal trajectory as illustrated in FIG. 15. A sufficiently safe path is calculated for the normal trajectory, but an emergency trajectory is calculated as a branch when it is predicted that there may be a collision with another vehicle or obstacle depending on the situation several seconds after.

The trajectory generation determination unit adds the information for transition to the trajectory information to make a transition from the normal trajectory to the emergency trajectory. Then, the trajectory generation determination unit 603 transmits the trajectory information on the normal trajectory and the trajectory information on the emergency trajectory to the motion control unit 604. When the normal trajectory is to be changed, or the emergency trajectory is to be changed, or the vehicle is about to pass through the point of branch between the emergency trajectory and the normal trajectory, or the like, the trajectory generation determination unit 603 calculates a new emergency trajectory and transmits the same to the motion control unit 604 or transmits a new emergency trajectory calculated in advance to the motion control unit 604. The motion control unit 604 receives the trajectory information on the emergency trajectory and retains the same in the trajectory retaining unit 6042. According to the example, the emergency trajectory calculated by the emergency trajectory generating unit is partway the same as the normal trajectory. Accordingly, it is possible to decrease the amount of calculation of the distance by which the trajectories overlap or the time for which the trajectories overlap as compared to the case in which the emergency trajectory and the normal trajectory are calculated separately. Further, it is possible to decrease the total amount of the trajectory information on the emergency trajectory and the normal trajectory, thereby reducing the volume of communication, as compared to using the method by which the normal trajectory and the emergency trajectory are transmitted at any time.

Sixth Example

A vehicle control system in a sixth example according to the present invention will be explained. The sixth example is different from the first example in that the intervals between communications in the emergency trajectory are lengthened. The same components as those of the example explained above will be given the same reference signs as those of the foregoing example and descriptions thereof will be omitted below.

Figure 16:
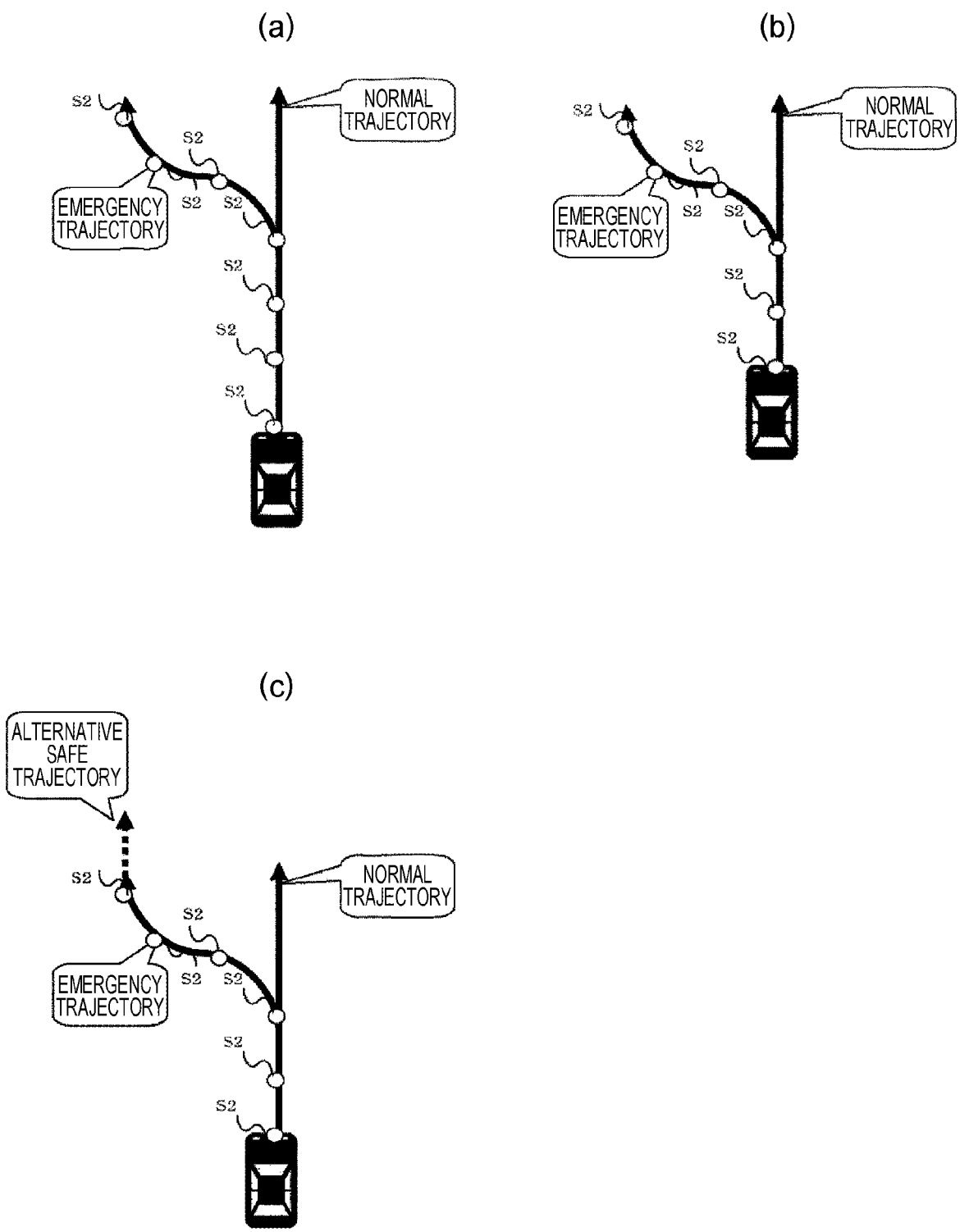
FIGS. 16(a) to 16(c) illustrate trajectory examples where alternative safe trajectories are calculated.

When a trajectory is not calculated in sufficiently short cycle (for example, intervals of 10 ms) to control the drive device, the time during which running is enabled is different between immediately after the calculation of a trajectory as illustrated in FIG. 16(a) and immediately before the calculation of a trajectory as described in FIG. 16 (b). Accordingly, immediately after the calculation of a trajectory, an alternate safety trajectory as illustrated in FIG. 16 (c) is used from the terminal end of the last trajectory until the next calculation of a trajectory. As examples of alternative safe trajectories, the speed is slightly decreased from the terminal end of the trajectory and no trajectory other than the straightforward one such as one with a lane change is taken, or a trajectory for maintaining the current lane with a slight decrease in speed is taken, or a trajectory for decreasing the speed while pulling over to the shoulder of the road is taken. The emergency trajectory generating unit 6042 evaluates the alternative safety trajectory and transmits information on its usability to the motion control unit 604. The motion control unit 604 receives the trajectory information on the alternative path as described above from the trajectory generation determination unit 603 at the point in time when the system trajectory is started, and retains the same in the trajectory retaining unit.

After using all the trajectory information on the emergency trajectories, the motion control unit 604 controls the drive device according to the alternative trajectory retained in the trajectory retaining unit 6042.

According to the example, even though the intervals of updating the emergency trajectory are lengthened and the trajectory generation determination unit becomes failed and the trajectory can be controlled in safe only for a short time before the operation is passed over to the user because the trajectory retaining unit does not retain the trajectory information with sufficiently time intervals and there is a fear of a collision with another obstacle after the end of the safe trajectory, the motion control unit can calculate the unnecessary trajectory information. This makes it possible to perform a control at any time by the use of the trajectory information with sufficient time intervals until the operation is passed over to the user after the occurrence of a failure in the trajectory generation determination unit, and prevent occurrence of a collision with another obstacle after the end of the emergency trajectory.

Seventh Example

A vehicle control system in a fifth example according to the present invention will be explained. The seventh example is different from the first example in that it is possible to pass over driving to the user in a safer manner. The same components as those of the example explained above will be given the same reference signs as those of the foregoing example and descriptions thereof will be omitted below.

The trajectory generation determination unit 603 calculates the final state of the emergency trajectory in such a manner that the emergency trajectory can be passed over to the user in safety. The state in which the emergency trajectory can be passed over to the user in safety refers to the state in which the handling angle of the steering wheel or the steering angle of the vehicle body takes a specific value or less. For example, when the emergency trajectory is passed over in a straight-ahead state, if the handling angle of the steering wheel or the steering angle of the vehicle body needs to be a specific angle or more in any section subsequent to the trajectory section in the straight-ahead state due to a sharp curve or an obstacle, the user needs to handle the steering wheel quickly immediately after taking over the operation and may collide with another vehicle or obstacle. Accordingly, the state of the emergency trajectory easy to pass over to the user refers to the state in which the handling angle of the steering wheel or the steering angle of the vehicle body is a specific angle or less in the trajectory immediately after the passing over and the subsequent trajectories. In addition, another example of the state of the emergency trajectory that can be passed over to the user in safety will be explained. When deceleration is required in the safe emergency trajectory, operating the brake by the user might cancel the necessary instruction for deceleration and pose a danger to the user. Accordingly, another example of state of the emergency trajectory easy to pass over to the user refers to the state in which there is no need to apply a brake by constant force or more in the trajectory at the time of passing over and the subsequent trajectories.

Figure 17:
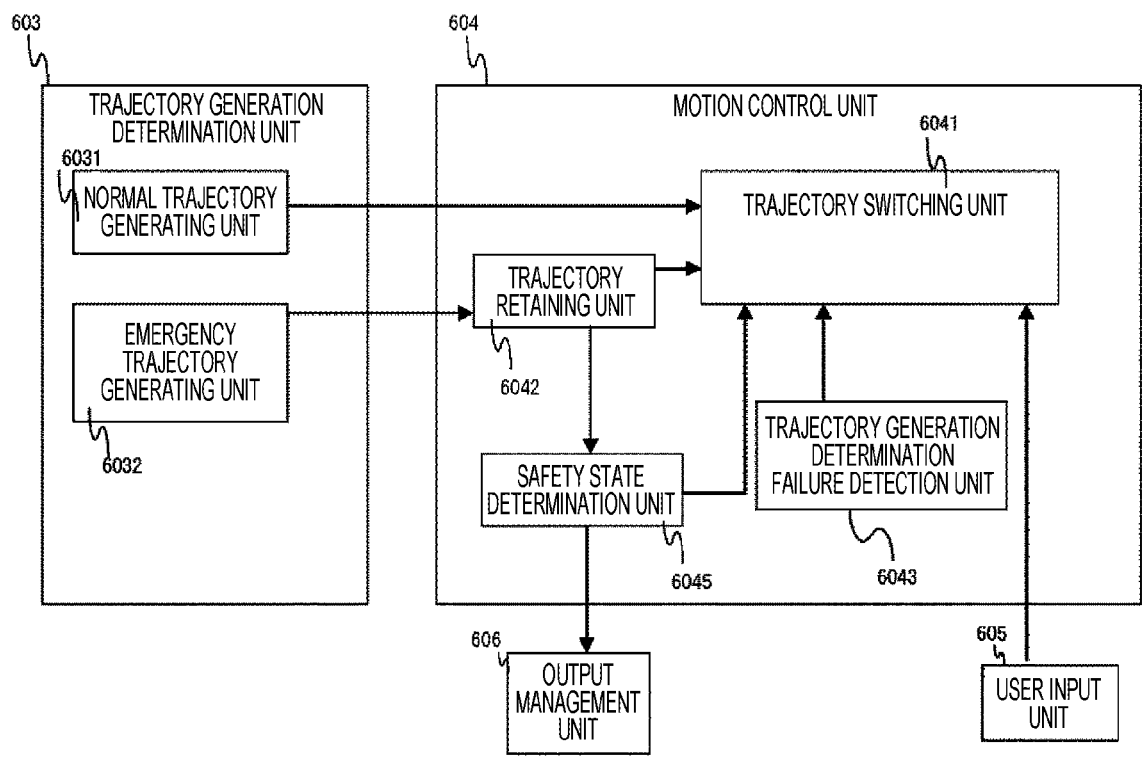
FIG. 17 illustrates internal configuration examples of the trajectory generating unit and the motion control unit for determining the safety state of the trajectory.

A safety state determination unit 6045 included in the motion control unit 604 illustrated in FIG. 17 determines whether the trajectory retained in the trajectory retaining unit 6042 is safe during operation in the emergency trajectory. When the trajectory is safe, the safety state determination unit 6045 notifies the output device 7 that the current trajectory is safe. The output device 7 makes a notification to the user by the use of a screen output 1302 in which to display a message to notify whether driving is possible or a screen output 1303 in which to display a symbol to notify whether driving is possible as illustrated in FIG. 18. As other methods, when there is a lamp for providing information to the user, the lamp may be switched from the indication of current driving in the emergency trajectory to the indication of the state in which the emergency trajectory is easy to pass over to the user, and when there is a sound output device such as a speaker, a sound or a warning beep may be used to notify the user of the state in which the emergency trajectory is easy to pass over to the user or a vibration device may be used to notify that to the user. Calculating the state in which the emergency trajectory can be passed over to the user in safety from the trajectory information on the emergency trajectory as described above makes it possible to notify the user of the state in which the emergency trajectory can be passed over to the user in safety by the use of the output device 7, and allows the user to determine the state in which driving is possible. Accordingly, the user can start driving in a safer state when taking over the driving.

Eighth Example

A vehicle control system in an eighth example according to the present invention will be explained. The eighth example is different from the first example in that it is possible to notify the user of a timing when the user can take over the driving in safety. The same components as those of the example explained above will be given the same reference signs as those of the foregoing example and descriptions thereof will be omitted below.

The safety state determination unit 6045 included in the motion control unit 604 illustrated in FIG. 17 calculates the trajectory section in the safe state in the trajectory information retained in the trajectory retaining unit 6042 during operation in the emergency trajectory or in the normal trajectory. The trajectory retaining unit 6042 transmits the trajectory information on the emergency trajectory to the output device 7, and the safety state determination unit 6045 transmits the trajectory section in the safe state to the output device 7. The output device 7 displays the position of the subject vehicle and the trajectory in which the subject vehicle moves as illustrated in FIG. 18. 1301. The trajectory in which the subject vehicle moves includes a trajectory in the safe state 1301A and a trajectory not in the safe state 1301B. The trajectory 1301A is emphasized by blinking, a fluorescent color, an intense light, or the like. In another example of output of the output device 7, the remaining time before reaching the trajectory in the safe state is read aloud by a sound output device such as a speaker or a remaining time 1304 is displayed on a display device 1300. Accordingly, it is possible to determine the section in the emergency trajectory in which the user can take over the driving in safe and output the determined result by the output device 7. This allows the user to understand the timing at which the user can take over the driving in safety in the trajectory and start the driving in the safe state.

Ninth Example

A vehicle control system in a ninth example according to the present invention will be explained. The ninth example is different from the ninth example in that the user can drive more safely when taking over the driving. The same components as those of the example explained above will be given the same reference signs as those of the foregoing example and descriptions thereof will be omitted below.

In the example, the motion control unit 604 determines whether the trajectory retained by the trajectory retaining unit 6042 is in the safe state described above in relation to the emergency trajectory generation process during operation in the emergency trajectory as in the fifth example. When not determining that the emergency trajectory is in the safe state, the trajectory switching unit 6041 disables inputs of the user's operations (rotating the steering wheel, and treading on the accelerator pedal or the brake pedal), and performs only operations in the emergency trajectory. Accordingly, the trajectory switching unit 6041 of the example acquires inputs from the user input unit 605 as illustrated in FIG. 17.

Disabling passing over the driving can be applied to situations other than driving in the emergency trajectory. For example, when the emergency trajectory and the normal trajectory coincide partly with each other as in the third example, it is possible to determine whether the trajectory retained by the trajectory retaining unit 6042 is in the safe state while the control is performed by the use of the trajectory information on the normal trajectory. When not determining that the trajectory is in the safe state, the trajectory switching unit 6041 disables inputs of the user's operations (rotating the steering wheel, and treading on the accelerator pedal or the brake pedal), and performs only operations based on the trajectory information.

According to the foregoing example, when the motion control unit 604 does not determine that the trajectory is in the safe state, the inputs from the user can be ignored and the possibility that the user drives in a dangerous state resulting in an accident becomes very low, thereby allowing the driving to be passed over in safety.

REFERENCE SIGNS LIST 1 vehicle system
2 vehicle control system
3 communication device
4 vehicle control system
5 drive device
6 recognition device
7 output device
8 input device
9 notification device
301 network link
302 ECU
303 GW
401 processor
402 I/O
403 timer
404 ROM
405 RAM
406 internal bus
501 control unit
502 communication management unit
503 time management unit
504 data table
505 buffer
601 action plan system
602 integral recognition unit
603 trajectory generation determination unit
604 motion control unit
605 user input unit
606 output management unit
607 notification management unit
608 failure detection unit
1001 outside recognition map
1300 display device
1301 status indication
1302 path display
1303 failed part indication
S1 normal trajectory information
S2 emergency trajectory information
6031 normal trajectory generating unit
6032 emergency trajectory generating unit
6033 safety pattern verification unit
6041 trajectory switching unit
6042 trajectory retaining unit
6043 trajectory generation determination failure detection unit
6045 safety status determination unit
1901 emergency trajectory pattern specification information
1902 transition order information
1903 trajectory information control information
1904 emergency trajectory pattern specification information
1905 emergency trajectory pattern use disability determination result

The invention claimed is:
1. A control system for a vehicle, comprising:
a plurality of sensors that acquire physical measurement values of an environment outside of the vehicle;
a plurality of actuators that control motion of the vehicle; and
a processor that is communicatively coupled to the plurality of sensors and the plurality of actuators;
wherein the processor is configured to:
calculate a first trajectory of the vehicle based on the physical measurement values acquired by the plurality of sensors, wherein a driver of the vehicle is permitted to control the vehicle while moving along the first trajectory,
detect a failure in at least one of the plurality of sensors while traveling along the first trajectory and the plu- rality of actuators while traveling along the first trajectory, and when the failure is detected:

calculate an emergency trajectory based on the physical measurement values acquired by the plurality of sensors, wherein the emergency trajectory deviates from the first trajectory, control, using the plurality of actuators, the vehicle by changing the first trajectory to the emergency trajectory, by suppressing at least one vehicle control input, the at least one vehicle control input configured to control the vehicle while the vehicle moves according to the emergency trajectory, determine whether the current trajectory is in a safe trajectory, wherein the safe trajectory is a portion of the emergency trajectory in which at least one of a steering angle of a steering wheel and a steering angle of the vehicle body is less than or equal to a predetermined angle in the emergency trajectory, and wherein the vehicle enters the safe trajectory subsequent to entering the emergency trajectory;

if the current trajectory is determined to be in the safe trajectory, cancel suppression of the vehicle control input, and audibly outputs an amount of time until the vehicle is controlled according to the safe trajectory, wherein suppression of the vehicle control input is then automatically cancelled;

else when the current trajectory is determined not to be in the safe trajectory, calculate the safe trajectory wherein suppression of the vehicle control input will be cancelled and transfer a control of the vehicle from the processor to the driver of the vehicle.

2. The control system according to claim 1, further comprising a display that is communicatively coupled to the processor, wherein the processor is further configured to:

display an amount of time until the vehicle is controlled according to the safe trajectory, wherein suppression of the vehicle control input is then automatically cancelled.

3. The control system according to claim 1, wherein the processor calculates the emergency trajectory by:

generating a plurality of possible emergency trajectories, determining a plurality of attributes of each of the plurality of possible emergency trajectories, and selecting one of the possible emergency trajectories as the emergency trajectory based on the plurality of attributes of each the plurality of possible emergency trajectories, and wherein the plurality of attributes includes at least a probability of collision.

4. The control system according to claim 1, further comprising:

a display that is communicatively coupled to the processor, wherein the processor is further configured to:

display the first trajectory and the emergency trajectory, via the display.

5. The control system according to claim 1, wherein the processor determines the emergency trajectory is in the safe trajectory based on trajectory information of the vehicle while moving along the emergency trajectory, and wherein the safe trajectory is a portion of the emergency trajectory.

* * * * *